(12) United States Patent
Schlag

(10) Patent No.: US 8,020,448 B2
(45) Date of Patent: Sep. 20, 2011

(54) PRESSURE SENSOR WITH NONLINEAR CHARACTERISTIC CURVE

(75) Inventor: Harald Schlag, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/255,129

(22) Filed: Oct. 21, 2008

(65) Prior Publication Data

US 2010/0099008 A1   Apr. 22, 2010

(51) Int. Cl.
*G01L 7/08*  (2006.01)
(52) U.S. Cl. ............................................. 73/714; 73/715
(58) Field of Classification Search .......................... None
See application file for complete search history.

(56) References Cited

U.S. PATENT DOCUMENTS

| | | | | |
|---|---|---|---|---|
| 6,155,233 A * | 12/2000 | Wade et al. | ................... | 123/458 |
| 6,422,206 B1 * | 7/2002 | Wade et al. | ................... | 123/458 |
| 6,923,068 B2 * | 8/2005 | Barron | ............................. | 73/719 |
| 6,986,649 B2 * | 1/2006 | Dai et al. | ................... | 417/413.2 |
| 2001/0023616 A1 * | 9/2001 | Wade et al. | ...................... | 73/756 |
| 2005/0150302 A1 * | 7/2005 | Barron | ............................. | 73/719 |
| 2006/0042395 A1 * | 3/2006 | Lepine et al. | ................... | 73/753 |
| 2006/0090569 A1 * | 5/2006 | Myagawa et al. | ............... | 73/753 |
| 2007/0074575 A1 * | 4/2007 | Voto et al. | ...................... | 73/715 |
| 2007/0113660 A1 * | 5/2007 | Matsui | ............................. | 73/715 |
| 2008/0087069 A1 * | 4/2008 | Renken et al. | ................... | 73/1.63 |
| 2009/0178487 A1 * | 7/2009 | Girroir et al. | ................... | 73/716 |
| 2009/0293630 A1 * | 12/2009 | DiPaola et al. | ................. | 73/756 |
| 2010/0206085 A1 * | 8/2010 | Sekiya et al. | ................... | 73/723 |

FOREIGN PATENT DOCUMENTS

| | | |
|---|---|---|
| CN | 1839300 | 9/2006 |
| JP | 52043474 | 4/1977 |

* cited by examiner

*Primary Examiner* — Andre J Allen
(74) *Attorney, Agent, or Firm* — Fraser Clemens Martin & Miller LLC; J. Douglas Miller

(57) ABSTRACT

A pressure sensor adapted to provide a high resolution at a low pressure and a high pressure of an operating range is provided. The pressure sensor includes a body having an interface surface, a membrane sealingly disposed in the cavity adjacent the interface surface, and a sensing element in communication with the membrane. A fuel cell system including the pressure sensor is also provided.

15 Claims, 3 Drawing Sheets

PRESSURE SENSOR WITH NONLINEAR CHARACTERISTIC CURVE

FIELD OF THE INVENTION

The invention relates to a pressure sensor and, more particularly, to a pressure sensor adapted to provide a high resolution at a low pressure and a high pressure of an operating range.

BACKGROUND OF THE INVENTION

A fuel cell has been proposed as a power source for electric vehicles and other applications. In proton exchange membrane (PEM) type fuel cells, hydrogen or another suitable fuel is supplied to an anode of the fuel cell and oxygen is supplied as an oxidant to a cathode. An electrochemical reaction within the fuel cell generates electricity. A plurality of fuel cells is stacked together in a fuel cell stack. A fuel cell system includes at least one fuel cell stack and a plurality of components necessary for operation of the fuel cell stack. Typically, at least one fuel cell stack is required to power a vehicle. Large amounts of hydrogen or other suitable fuel stored in a fuel tank on the vehicle are supplied to the fuel cell stack.

The fuel tank typically stores the fuel in a highly compressed state (up to 900 bar), to decrease a size of the tank and to increase a travel range of the vehicle. The fuel tank may include a polymeric liner to militate against fuel leaks, a composite shell to withhold a pressure of the tank, and an outer casing to militate against damage to the tank. A layering of a plurality of the fuel tank components may require a biasing force from within the tank to militate against a deformation of the polymeric liner. The biasing force may be a minimum tank pressure, which must be monitored accurately when the pressure of the fuel tank is lowered. The pressure of the fuel tank may be lowered during one of an operation of the fuel cell system and in an anticipation of the fuel tank removal. A refueling of the fuel tank also requires accurate pressure monitoring. During the refueling of the fuel tank, a maximum tank pressure is monitored to militate against an overpressure of the fuel tank.

A pressure sensor affixed to one of the fuel tank and the fuel cell system is used to monitor the pressure of the tank. A cost of the pressure sensor is determined by a sensor resolution and a pressure range of the pressure sensor. The pressure sensor having a high sensor resolution (1% of a range of the sensor) and a large pressure range (from 5 to 900 bar) is excessive in cost, and increases a cost of the vehicle in which the pressure sensor is incorporated. The pressure sensor having the high sensor resolution is necessary for one of the refueling of the fuel tank (maximum tank pressure) and the anticipation of the fuel tank removal (minimum tank pressure).

For fuel cell applications, the high sensor resolution is not needed for a large portion of the pressure range (about 25 bar to 500 bar) because the maximum tank pressure and the minimum tank pressure are not reached. Accordingly, the high sensor resolution in this range is not needed and unnecessarily increases the cost of the vehicle in which the pressure sensor is incorporated.

There is a continuing need for a pressure sensor that is cost-effective, has a large pressure range, and has a high relative accuracy in a low pressure range and a high pressure range.

SUMMARY OF THE INVENTION

Presently provided by the invention, a pressure sensor that is cost effective, has a large pressure range, and has a high relative accuracy in a low pressure and a high pressure is surprisingly discovered.

In a first embodiment, the pressure sensor comprises a main body having an interface surface, the interface surface forming a portion of a cavity formed in the body, a membrane sealingly disposed in the cavity adjacent the interface surface, wherein a pressure of a fluid in communication with a first side of the membrane causes a deflection of the membrane, and wherein the deflection of the membrane causes a second side thereof to contact the interface surface, and a sensing element adapted to measure the deflection of the membrane and transmit a signal representing the deflection of the membrane.

In another embodiment, a fuel cell system comprises a fuel cell stack having a plurality of fuel cells, a fuel tank for the storage of fuel in a highly compressed state, a fuel conduit between the fuel cell stack and the fuel tank, and a pressure sensor in fluid communication with one of the fuel tank, the fuel conduit, and a fuel valve, the pressure sensor including a main body having an interface surface, the interface surface forming a portion of a cavity formed in the body, a membrane sealingly disposed in the cavity adjacent the interface surface, wherein a pressure of a fluid in communication with a first side of the membrane causes a deflection of the membrane, wherein the deflection of the membrane causes a second side thereof to contact the interface surface, and a sensing element adapted to measure the deflection of the membrane and transmit a signal representing the deflection of the membrane.

In a further embodiment, the pressure sensor comprises a main body having an interface surface including one of a convex portion, a concave portion, and a conical portion, the interface surface forming a portion of a cavity formed in the body, a substantially disk shaped membrane sealingly disposed in the cavity adjacent the interface surface, wherein a pressure of a fluid in communication with a first side of the membrane causes a deflection of the membrane, wherein the deflection of the membrane causes a second side thereof to contact the interface surface, and a sensing element adapted to measure the deflection of the membrane and transmit a signal representing the deflection of the membrane.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention.

The description and drawings serve to enable one skilled in the art to make and use the invention, and are not intended to limit the scope of the invention in any manner.

Figure 1:
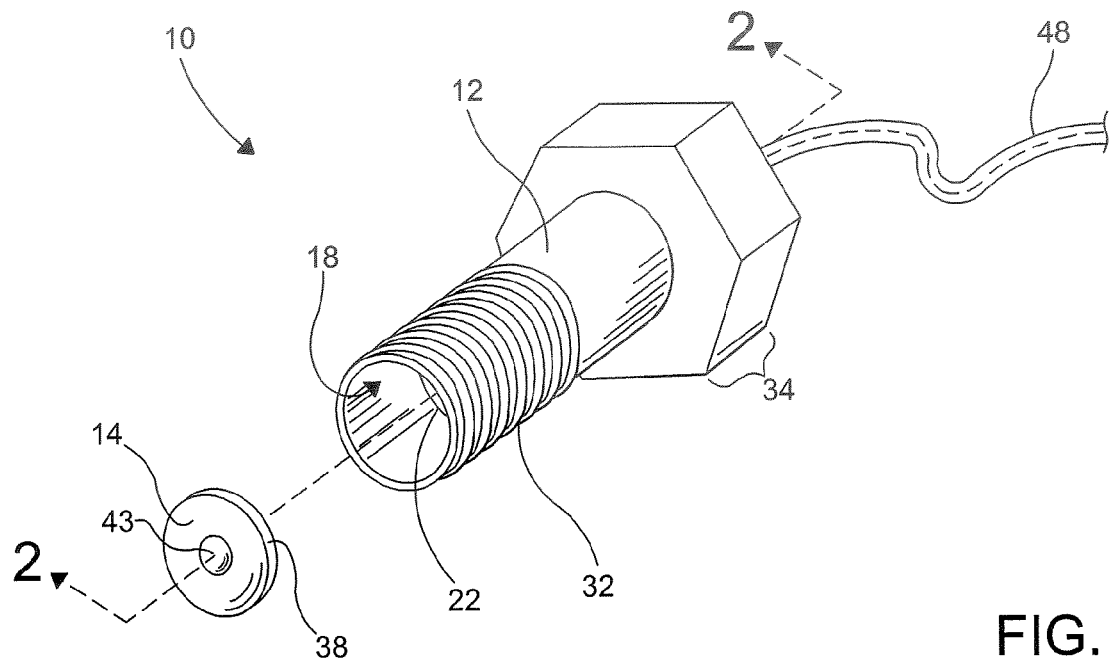
FIG. 1 is an exploded perspective view of a pressure sensor according to the present disclosure.

FIG. 1 shows a pressure sensor 10 adapted for a high resolution in a low pressure and a high pressure range according to an embodiment of the invention. The pressure sensor 10 includes a main body 12, a membrane 14, and a sensing element 16.

Figure 2:
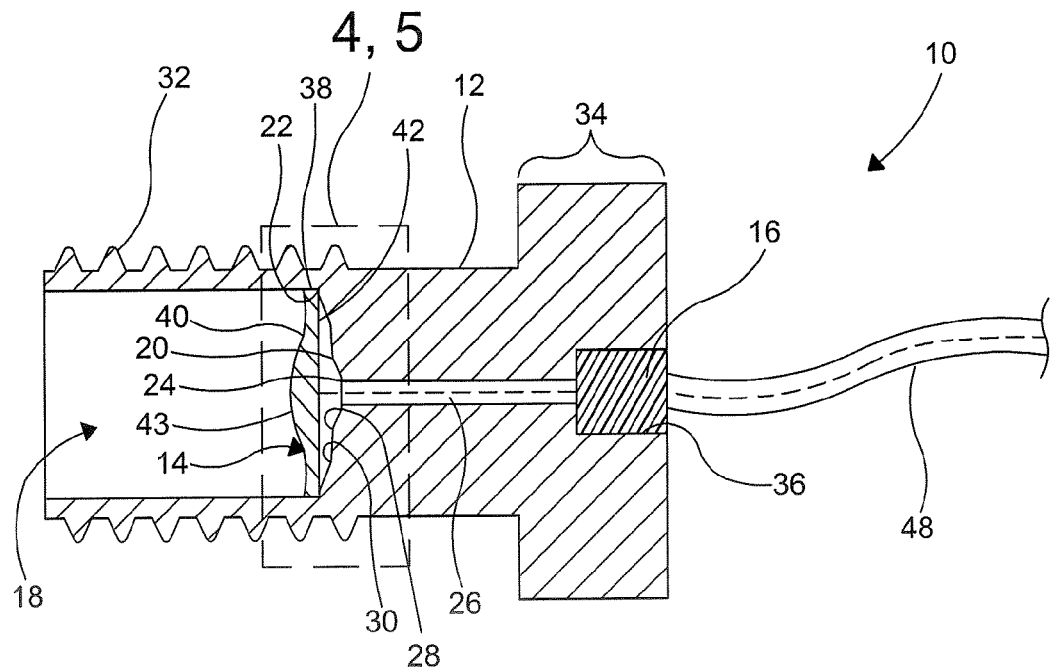
FIG. 2 is cross-sectional view of the pressure sensor illustrated in FIG. 1 taken along section 2-2.
Figure 4:
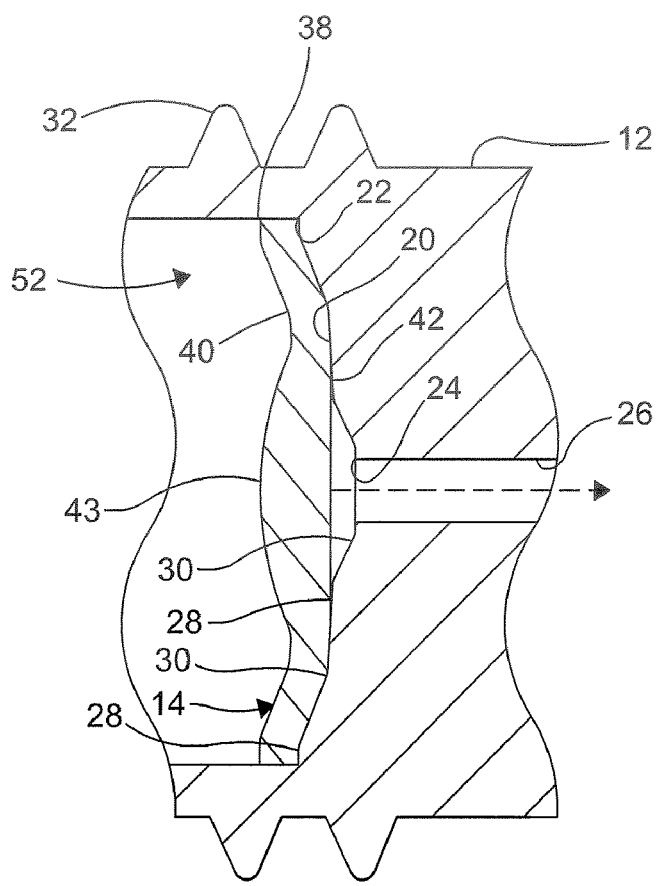
FIG. 4 is an enlarged fragmentary cross-sectional view of the pressure sensor illustrated in FIG. 2, showing a membrane exposed to an intermediate pressure.
Figure 5:
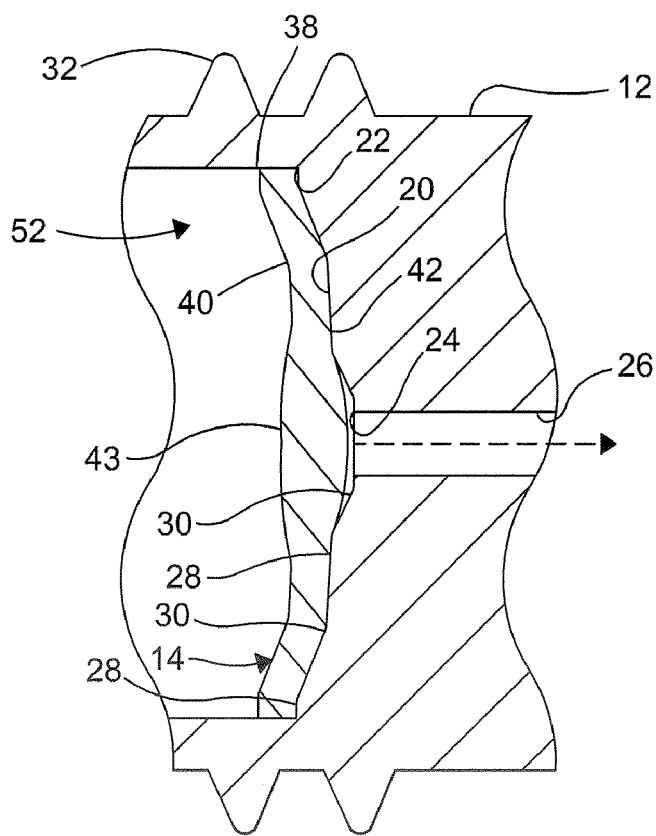
FIG. 5 is an enlarged fragmentary cross-sectional view of the pressure sensor illustrated in FIG. 2, showing a membrane exposed to a high pressure.

The main body 12 can be produced from any conventional material used to manufacture sensors and transducers such as aluminum or stainless steel, for example. As shown, the main body 12 is substantially cylindrical, but other shapes may be used. The main body 12 includes a cavity 18 formed therein, a portion of the cavity 18 including a membrane interface surface 20 as illustrated in FIGS. 2, 4, and 5. The cavity 18 may be substantially cylindrical, but other shapes may be used. The membrane interface surface 20 is defined by an outer peripheral edge 22 and an inner peripheral edge 24. The inner peripheral edge 24 defines a first aperture 26 formed in the main body 12. The first aperture 26 is formed in the main body 12 between the sensing element 16 and the cavity 18. The membrane interface surface 20 includes at least one of a convex portion 28, a concave portion 30, and a conical portion. As illustrated in FIGS. 2, 4, and 5, the membrane interface surface 20 includes one convex portion 28 and one concave portion 30. Alternately, the membrane interface surface 20 may be one of a convex surface, a concave surface, a conical surface, or any combination thereof. The at least one convex portion 28 and the at least one concave portion 30 are substantially concentric with the inner peripheral edge 24 and the outer peripheral edge 22. As a non-limiting example, the membrane interface 20 surface may include two convex portions 28 and two concave portions 30, alternately arranged. The convex portions 28 and the concave portions 30 cooperate to form a depression in the membrane interface surface 20 near the inner peripheral edge 24.

The main body 12 has a fastening means 32 and a head portion 34. The fastening means 32 may be a threaded surface disposed on one of an inner and an outer surface of the main body 12. The head portion 34 is adapted to receive a device used to impart rotational movement to the main body 12 such as a wrench, for example. The head portion 34 may be located on an end of the main body 12 opposite the cavity 18, or at an intermediate portion of the main body 12. A second aperture 36 is formed in the main body 12 adapted to receive the sensing element 16. Alternately, the sensing element 16 may be coupled to an end of the main body 12 opposite the cavity 18 or be disposed on the membrane 14.

The membrane 14 may be formed from any conventional material such as a silicon based material, a metal, a ceramic, or a glass. As illustrated in FIGS. 1, 2, 4, and 5, the membrane 14 is substantially disk shaped, but other shapes may be used. The membrane 14 having a substantial disk shape may be used where the membrane interface surface 20 is one of the convex surface, the concave surface, the conical surface, or any combination thereof. The membrane 14 having a constant thickness may be used where the membrane interface surface 20 is one of the convex surface, the concave surface, the conical surface, or any combination thereof. As illustrated in FIGS. 2, 4, and 5, the membrane 14 has a first thickness at a center of the membrane 14 and a second thickness at a membrane peripheral edge 38. The membrane peripheral edge may substantially correspond to an outer peripheral edge 22 of the membrane interface surface 20. In the embodiment shown, the first thickness is greater than the second thickness. The membrane 14 is sealingly disposed in the cavity 18 by any conventional means such as an adhesive, a welding, or a fastener to provide a substantially impermeable barrier between the cavity 18 and the first aperture 26. The membrane 14 has a first side 40 and a second side 42. The first side 40 faces away from the membrane interface surface 20 and may be characterized by a centrally located protuberance 43. The second side 42 faces toward the membrane interface surface 20. An area of the second side 20 in contact with the membrane interface surface 20 is an abutment area of the second side 42.

Figure 3:
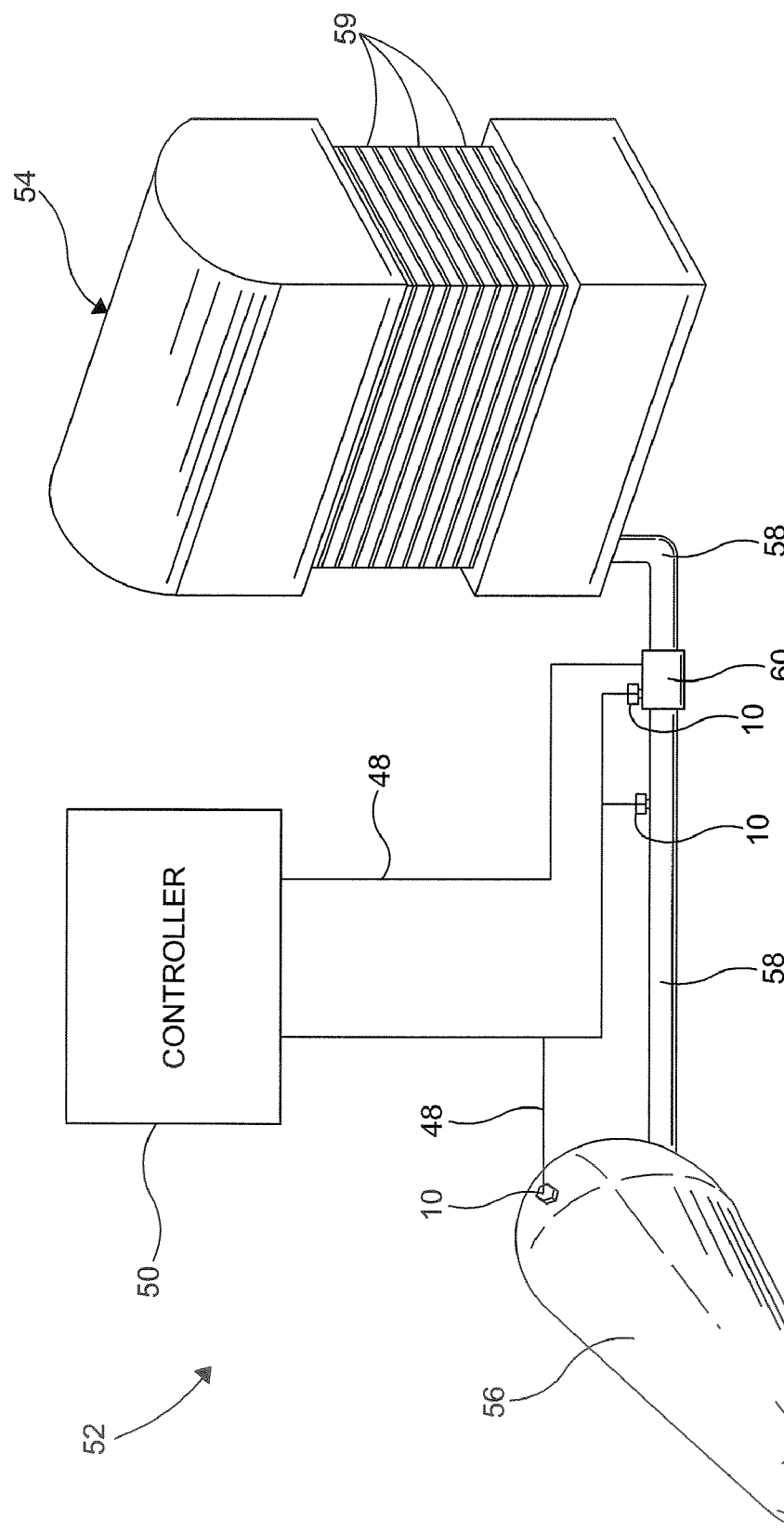
FIG. 3 is a schematic drawing of a fuel cell system including the pressure sensor illustrated in FIG. 1.

The sensing element 16 is adapted to measure a deflection of the membrane 14 and transmit a signal representing an amount of the deflection of the membrane 14. The sensing element 16 measures the deflection of the membrane 14 through one of a mechanical, an electrical, and an optical communication. The sensing element 16 measures and processes the deflection of the membrane 14 through one of a strain gauge, a piezoresistive element, a variable capacitance element, an optical sensor, a variable inductance element, a magnetic element, and an interferometer. A function that represents the signal generated by the sensing element 16 when the membrane 14 is deflected may be one of a monotonic increasing function and a monotonic decreasing function. The monotonic increasing function is a function wherein an output value is always increasing or stays the same when an input value is increasing. The monotonic decreasing function is a function wherein an output value is always decreasing or stays the same when an input value is increasing. The function that represents the signal generated by the sensing element 16 when the membrane 14 is deflected may be one of a strictly monotonic increasing function and a strictly monotonic decreasing function. The strictly monotonic increasing function is a function wherein an output value is always increasing when an input value is increasing. The strictly monotonic decreasing function is a function wherein an output value is always decreasing when an input value is increasing. As illustrated in FIG. 3, the signal may be transmitted by any conventional means such as a conduit 48 to a controller 50 or other processing device. One skilled in the art will recognize the conduit 48 may also house a power source or additional components necessary for the operation of the pressure sensor 10, and that the sensing element 16 may be any sensing element.

The pressure sensor 10 is one of an absolute pressure sensor and a gauge pressure sensor. When the pressure sensor 10 is an absolute pressure sensor, the pressure sensor 10 includes at least a partial vacuum adjacent the second side 42 of the membrane 14.

FIG. 3 illustrates a fuel cell system 52 according to an embodiment of the present invention. The fuel cell system 52 includes a fuel cell stack 54, a fuel tank 56, a fuel conduit 58, and the pressure sensor 10. The fuel cell stack 54 includes a plurality of individual fuel cells 59. In the fuel cell system 52, fuel is stored in the fuel tank 56 in a highly compressed state (up to 900 bar). The fuel may be a liquid or a compressed gas, such as hydrogen, for example. The fuel tank 56 is in fluid communication with the fuel cell stack 54. A fuel valve 60 may be disposed in the fuel conduit 58. The pressure sensor 10 is coupled to one of the fuel tank 56, the fuel conduit 58, and the fuel valve 60. One skilled in the art will recognize the pressure sensor 10 may be disposed on any component of the fuel cell system 52 exposed to a pressure of the fuel. The pressure sensor 10 may also be disposed on more than one component of the fuel cell system 52. The pressure sensor 10 and the fuel valve 60 are in electrical communication with the controller 50. The signal received by the controller 50 from the pressure sensor 10 may be used to determine an amount of fuel remaining in the fuel tank 56, indicate a low or high pressure in the fuel tank 56, operate the fuel valve 60, and other functions necessary for the operation of the fuel cell system 52.

In use, the pressure sensor 10 is coupled to one of the fuel tank 56, the fuel conduit 58, and the fuel valve 60, for example and is in electrical communication with the controller 50. It is understood that the controller 50 is in electrical communication with the fuel valve 60 and the fuel cell stack 54, as desired. When a vehicle the pressure sensor 10 is incorporated is in operation, the pressure sensor 10 provides the signal to the controller indicating the pressure of the fuel.

A traditional sensor (not shown) does not provide a sensor range and a sensor resolution that is adequate because of a substantially linear response and an excessive cost of a sensing element having a sensor resolution smaller than 1% of a range of the traditional sensor. The traditional sensor having the sensor range of about 0-900 bar and the sensor resolution of 0.25% may cost about $200. The traditional sensor having the sensor range of about 0-900 bar and the sensor resolution of 1% may cost about $100. The traditional sensor has the sensor resolution determined by a sensitivity of the sensing element and a deflection of the membrane. The substantially linear response of the traditional sensor does not afford measuring large pressure variations with great accuracy without the use of a sensing element having a resolution smaller than 1%. The substantially non-linear response of the pressure sensor 10 according to an embodiment of the present invention affords measuring at least one portion of large pressure variations with great accuracy without the use of a sensing element having a resolution smaller than 1%. The pressure sensor 10 according to the present invention maximizes a resolution for at least one portion of the pressure range.

A shape of the membrane interface surface 20 and the membrane 14 cooperate to determine the sensor range and the sensor resolution of the pressure sensor 10. As a pressure in the cavity 18 increases, the abutment area between the second side 42 of the membrane 14 and the membrane interface surface 20 also increases.

The membrane interface surface 20 may be described by an angular measurement between an axis in a direction of movement of the membrane 14 during pressure variations and the membrane interface surface 20. The angular measurement can be from 0° to 90°. When the angular measurement is 0°, the membrane interface surface 20 and the axis are parallel. When the angular measurement is 90°, the membrane interface surface 20 and the axis are perpendicular.

A variation of the angular measurement of the membrane interface surface 20 varies the sensor resolution. As illustrated in FIGS. 2, 4, and 5 the angular measurement of the membrane interface surface 20 varies from about 65° to about 85°. As a non-limiting example, the angular measurement of about 65° is a low angular measurement and the angular measurement of about 85° is a high angular measurement. The low angular measurement allows for a greater axial displacement by the membrane 14 than the high angular measurement, which allows for a small axial displacement. The low angular measurement and the high angular measurement are relative terms as the angular measurement may be varied to create the pressure sensor 10 with the sensor resolution as desired. The greater axial displacement afforded by the low angular measurement provides for a higher sensor resolution as compared to the high angular measurement which provides the small axial displacement.

FIG. 2 illustrates the pressure sensor 10 having very low or no pressure in the cavity 18 and the sensor resolution that is high because the membrane 14 is abutting a portion of the membrane interface surface 20 that has the low angular measurement. FIG. 4 illustrates the pressure sensor having an intermediate pressure in the cavity 18 and the sensor resolution that is low because the membrane 14 is abutting a portion of the membrane interface surface 20 that has the high angular measurement. FIG. 5 illustrates the pressure sensor having a high pressure in the cavity 18 and the sensor resolution that is high because the membrane 14 is abutting a portion of the membrane interface surface 20 that has the low angular measurement. As a non-limiting example, the pressure sensor 10 may have the sensor resolution of about 1 bar from about 5 bar to about 25 bar and the sensor resolution of about 10 bar from about 500 bar to about 900 bar.

The membrane 14 may be varied to create the pressure sensor 10 having the sensor range and sensor resolution as desired. The material of the membrane 14, the first thickness of the membrane 14, and the second thickness of the membrane 14 may be adjusted to create the membrane 14 having the sensor range and sensor resolution as desired. The material of the membrane 14, the first thickness of the membrane 14, and the second thickness of the membrane 14 may be adjusted to one of increase and decrease an effect the membrane interface surface 20 during the deflection of the membrane 14. As a non-limiting example, the membrane 14 formed from aluminum may provide greater deflection for a specific pressure range than the membrane 14 formed from a ceramic. As a second non-limiting example, the pressure sensor 10 may have the sensor range from about 5 bar to about 900 bar.

It should be appreciated that the pressure sensor 10 is cost-effective, has the large pressure range (5 bar to about 900 bar), and has a high relative accuracy (up to 1 bar). It is surprisingly found that the pressure sensor 10 ray be manufactured to suit a very particular need for the sensor resolution and the pressure range. The pressure sensor 10 thereby enables an accurate monitoring of the low pressure zone and the high pressure zone, without becoming cost prohibitive.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A pressure sensor, comprising:
    a main body having an interface surface, the interface surface forming a portion of a cavity formed in the body;
    a membrane sealingly disposed in the cavity adjacent the interface surface, wherein a pressure of a fluid in communication with a first side of the membrane causes a deflection of the membrane, and wherein the deflection of the membrane causes a second side thereof to contact the interface surface; and
    a sensing element adapted to measure the deflection of the membrane and transmit a signal representing the deflection of the membrane.

2. The pressure sensor of claim 1, wherein the membrane is substantially disk shaped.

3. The pressure sensor of claim 1, wherein the interface surface includes one of a convex portion, a concave portion, and a conical portion.

4. The pressure sensor of claim 3, wherein the interface surface includes at least one convex portion and at least one concave portion.

5. The pressure sensor of claim 3, wherein an inner peripheral edge of the interface surface defines a first aperture in the body.

6. The pressure sensor of claim 1, wherein the sensing element is one of a strain gauge, a piezoresistive element, a variable capacitance element, an optical sensor, a variable inductance element, a magnetic element, and an interferometer.

7. The pressure sensor of claim 1, wherein the membrane includes a first thickness at a center of the membrane and a second thickness at a peripheral edge of the membrane, the first thickness greater than the second thickness.

8. The pressure sensor of claim 1, wherein the body includes a fastening means disposed thereon.

9. The pressure sensor of claim 1, wherein the pressure sensor is one of an absolute pressure sensor and a gauge pressure sensor.

10. The pressure sensor of claim 1, wherein the pressure of the fluid in communication with the membrane is between about 5 bar and 900 bar.

11. The pressure sensor of claim 1, wherein the sensing element has a first sensor resolution of about 1 bar from about 5 bar to about 25 bar and a second sensor resolution of about 10 bar from about 500 bar to about 900 bar.

12. The pressure sensor of claim 1, wherein the sensing element is disposed in a second aperture formed in the body.

13. The pressure sensor of claim 1, wherein the membrane is formed from one of a silicon based material, a metal, a ceramic, and a glass.

14. The pressure sensor of claim 1, wherein the signal representing the deflection of the membrane is one of a monotonic increasing function and a monotonic decreasing function.

15. A pressure sensor, comprising:
a main body having an interface surface including one of a convex portion, a concave portion, and a conical portion, the interface surface forming a portion of a cavity formed in the body;
a substantially disk shaped membrane sealingly disposed in the cavity adjacent the interface surface, wherein a pressure of a fluid in communication with a first side of the membrane causes a deflection of the membrane, wherein the deflection of the membrane causes a second side thereof to contact the interface surface; and
a sensing element adapted to measure the deflection of the membrane and transmit a signal representing the deflection of the membrane.

* * * * *